United States Patent
Cole

(10) Patent No.: US 7,187,267 B2
(45) Date of Patent: Mar. 6, 2007

(54) SECURE DATA TAGGING SYSTEMS

(75) Inventor: Peter Harold Cole, West Lakes Shore (AU)

(73) Assignee: Tagsys Australia Pty Ltd. (AU)

( * ) Notice: Subject to any disclaimer, the term of this patent is extended or adjusted under 35 U.S.C. 154(b) by 0 days.

(21) Appl. No.: 10/863,144

(22) Filed: Jun. 8, 2004

(65) Prior Publication Data

US 2005/0017844 A1    Jan. 27, 2005

Related U.S. Application Data

(63) Continuation of application No. PCT/AU02/01671, filed on Dec. 10, 2002.

(30) Foreign Application Priority Data

Dec. 11, 2001  (AU) .................................... PR9394

(51) Int. Cl.
*G05B 19/00* (2006.01)
(52) U.S. Cl. .................. 340/10.1; 340/5.26; 340/5.61; 235/382.5
(58) Field of Classification Search ............... 340/10.1, 340/5.61, 5.26; 235/382.5, 380
See application file for complete search history.

(56) References Cited

U.S. PATENT DOCUMENTS

| | | | | |
|---|---|---|---|---|
| 5,591,951 A | * | 1/1997 | Doty | 340/10.3 |
| 5,629,981 A | * | 5/1997 | Nerlikar | 713/168 |
| 5,818,021 A | | 10/1998 | Szewczykowski | |
| 5,841,770 A | * | 11/1998 | Snodgrass et al. | 370/346 |
| 5,940,002 A | * | 8/1999 | Finn et al. | 340/5.26 |

(Continued)

FOREIGN PATENT DOCUMENTS

WO    WO-93/22745 A    11/1993

(Continued)

OTHER PUBLICATIONS

Finkenzeller K; "RFID-Handbuch: Grundlagen und praktische Anwendungen induktiver Funkanlagen, Transponder und kontaktloser Chipkarten, Passage" RFID Handbook; Grundlagen und Praktische Anwendungen, 1998, pp. 124-132, XP002255444.

(Continued)

*Primary Examiner*—Edwin C. Holloway, III
(74) *Attorney, Agent, or Firm*—Lerner, David, Littenberg, Krumholz & Mentlik, LLP

(57) ABSTRACT

A system is disclosed for secure communication between an interrogator and an RFID tag. The system includes means for singulating the tag in a population of RFID tags and means for extracting from the tag, identity data adapted to uniquely identify the tag. The system further includes means for securely communicating the identity data to a secure database, means for providing authentication data by the database and means for securely communicating the authenticating data to the interrogator. The system also includes means for providing a further communication between the tag and the interrogator, and wherein at least one stream of data between the tag and the interrogator includes random data generated via a random physical process. The tag and database may each include means for maintaining a count of secure authentications. The count may be separately maintained by the tag and database and may be incremented following each secure authentication. A method for secure communication between an interrogator and an RFID tag is also disclosed.

54 Claims, 4 Drawing Sheets

U.S. PATENT DOCUMENTS

| | | | | |
|---|---|---|---|---|
| 6,061,344 | A | * | 5/2000 | Wood, Jr. .................... 370/346 |
| 6,104,279 | A | * | 8/2000 | Maletsky ................. 340/10.41 |
| 6,130,623 | A | * | 10/2000 | MacLellan et al. .......... 340/5.1 |
| 6,226,619 | B1 | * | 5/2001 | Halperin et al. ................ 705/1 |
| 6,378,903 | B1 | * | 4/2002 | Yabutsuka et al. .......... 280/777 |
| 6,738,903 | B1 | * | 5/2004 | Haines ....................... 713/168 |
| 6,747,546 | B1 | * | 6/2004 | Hikita et al. ............. 340/10.31 |

FOREIGN PATENT DOCUMENTS

| WO | WO-99/04364 A1 | 1/1999 |
|---|---|---|
| WO | WO-01/57807 A1 | 8/2001 |

OTHER PUBLICATIONS

Supplemental European Search Report, EP 02 78 0973, Dated Jun. 24, 2005.

\* cited by examiner

SECURE DATA TAGGING SYSTEMS

CROSS REFERENCE TO RELATED APPLICATION

This application is a continuation of International Application No. PCT/AU02/01671, filed Dec. 10, 2002, the disclosure of which is hereby incorporated by reference herein.

FIELD OF THE INVENTION

The present invention relates to an object management system wherein information bearing electronically coded radio frequency identification (RFID) tags are attached to objects which are to be identified, sorted, controlled and/or audited. In particular the present invention relates to a system for authenticating RFID tags including the information that is contained in the tags.

BACKGROUND OF THE INVENTION

The object management system of the present invention includes information passing between an interrogator which creates an electromagnetic interrogation field, and the electronically coded tags, which respond by issuing a reply signal that is detected by the interrogator, decoded and consequently supplied to other apparatus in the sorting, controlling or auditing process. The objects to which the tags are attached may be animate or inanimate. In some variants of the system the interrogation medium may be other than electromagnetic, such as optical and/or acoustic.

Typically each tag in a population of such tags may have an identity that is defined by a unique number or code that is assigned to each tag, in a global numbering scheme. The tags may also carry other fixed or variable data. Communications between the interrogator and tags is via a radiofrequency electromagnetic link that is inherently insecure and susceptible to eavesdropping, or the insertion of bogus signals.

Under normal operation the tags may be passive, i.e. they may have no internal energy source and may obtain energy for their reply from the interrogation field, or they may be active and may contain an internal energy source, for example a battery. Such tags respond only when they are within or have recently passed through the interrogation field. The interrogation field may include functions such as signalling to an active tag when to commence a reply or series of replies or selecting a single tag among a population of such tags, or in the case of passive tags may provide energy, a portion of which may be used in constructing the reply.

One example of an insecure electronic tag reading system is illustrated in FIG. 1. In FIG. 1 an interrogator 11, containing a transmitter and receiver, both operating under a controller, communicate via electromagnetic means with a code responding electronic tag 10. This system has a disadvantage in that information passing between tag 10 and interrogator 11 is directly related to information stored within tag 10. A further disadvantage is that the process of communication between tag 10 and interrogator 11 is susceptible to eavesdropping. Because such communication is normally carried out by electromagnetic waves, a clandestine receiver located nearby may make a record of the communication and deduce the data content of a legitimate tag. Knowledge of such data content may subsequently allow counterfeit tags to be manufactured by an unscrupulous party or parties. Such tags may appear legitimate because they can generate data content that is indistinguishable from genuine tags. Eavesdropping may take place either on interrogator to tag communication or tag to interrogator communication. Because of a substantial difference in signal levels involved, communication in the direction from interrogator to tag is much more vulnerable to eavesdropping than is communication in the reverse direction.

In some systems it is important to guard against eavesdropping in one, other or both directions or even to conceal the fact that an information extraction process is under way. Guarding against eavesdropping is particularly important when private information is being extracted from the tag.

Communication between the interrogator and tag is frequently via an exchange of messages in a half duplex mode, but in some systems single bits of data may alternately be sent between interrogator and tag. In this case it is common to regard the process of extraction of data from the tag as equivalent to exploration of a binary tree as illustrated in FIG. 2. In FIG. 2 different bits of a tag identity or tag internal data correspond to different levels of the tree, and a single tag with particular data corresponds to a particular path through the tree. Different paths through the tree correspond to different tags with different data.

As discussed above, it is desirable to ensure that tags are authentic, and not substitute tags which produce easily predictable responses of normal unencoded identification tags. An ability to provide such assurances may be required in product authentication, baggage reconciliation, secure entry systems and the like.

In a number of situations it may also be important that the flow of information between the tag and the interrogator is not meaningful to an eavesdropper. This may include situations where economic or military advantage can be gained from such information becoming known, or when owners of goods with attached tags desire to keep their ownership private. Hence, it is desirable to guard against eavesdropping on the process of communication between an electronic tag and its interrogator.

One defence against eavesdropping employs encryption of data passing between interrogator and tag. However, installation of complex circuits with encryption engines in the tag poses excessive demands on tags designs, which should be maintained as simple as possible for reason of costs. Moreover, even if such encryption engines are used, available encryption algorithms may still allow determined analysts to determine the parameters of those algorithms from eavesdropping operations.

SUMMARY OF THE INVENTION

The present invention provides a system that may determine the identity or data of a tag in a manner that defeats efforts at eavesdropping on the electromagnetic communication link. The system of the present invention may determine that the tag is genuine and not counterfeit. The system of the present invention may provide a relatively high level of security that is comparable to systems that make use of non re-used truly random codes. The system of the present invention may produce these results with a relatively simple and low cost tag. The system may also be capable of disguising the fact that an information extraction process is in progress.

The system of the present invention may, with addition to a tag of a simple and relatively small size writeable memory and acceptance of a limitation that there may be a limited number of authentications between operations of recharging the tag in a secure environment, provide an authentication system that matches the security of a one-time code. The system may also be used to extract in a secure way variable data from RFID tags. As part of the system, the interrogator may interact not only with the tag but also through secure communications with a secure database containing for each tag, security information used in the authentication process (refer FIG. 3).

Prior to a tag being put into service, one or more random codes may be generated for each tag by a truly random physical process. The random codes may be used to provide authentication test keys or numbers. The random codes may be loaded in a secure way into both the database and each tag. In the database, the random codes for each tag may be associated with an unencrypted tag serial number, or a separate but randomly chosen number that may be read from the tag by conventional tag interrogation processes.

In one embodiment communication between an interrogator and a single tag may be achieved through spatial separation between tags and their placement in close proximity to the interrogator.

The authentication system of the present invention may achieve extraordinary levels of security without a requirement to install within the tags complex circuits of encryption engines. The system may therefore be suitable for installation in relatively low cost RFID tags. The extraordinary levels of security are available because the system makes use of utterly random codes generated by a truly random physical process. The codes therefore will not be repeated more often than random numbers generated from truly random physical processes will be repeated.

According to the present invention there is provided a system for secure communication between an interrogator and an RFID tag, said system including:

means for singulating said tag in a population of RFID tags;

means for extracting from said tag, identity data adapted to uniquely identify said tag;

means for securely communicating said identity data to a secure database;

means for providing authentication data by said database;

means for securely communicating said authenticating data to said interrogator; and means for providing a further communication between said tag and said interrogator, wherein at least one stream of data between said tag and said interrogator includes random data generated via a random physical process.

The tag and the database may each include means for maintaining a count of secure authentications. The count may be separately maintained by the tag and the database and may be incremented following each secure authentication.

According to a further aspect of the present invention there is provided a method for secure communication between an interrogator and an RFID tag, said method including: singulating said tag from a population of RFID tags; extracting from said tag, identity data adapted to uniquely identify said tag;

securely communicating said identity data to a secure database;

providing authentication data by said database;

securely communicating said authentication data to said interrogator; and providing a further communication between said tag and said interrogator, wherein at least one stream of data between said tag and said interrogator includes random data generated via a random physical process.

The method may include the step of maintaining a count of secure authentications. The count may be separately maintained by the tag and the database and may be incremented following each secure authentication.

BRIEF DESCRIPTION OF THE DRAWINGS

A preferred embodiment of the present invention will now be described with reference to the accompanying drawings wherein.

DETAILED DESCRIPTION

Figure 1:
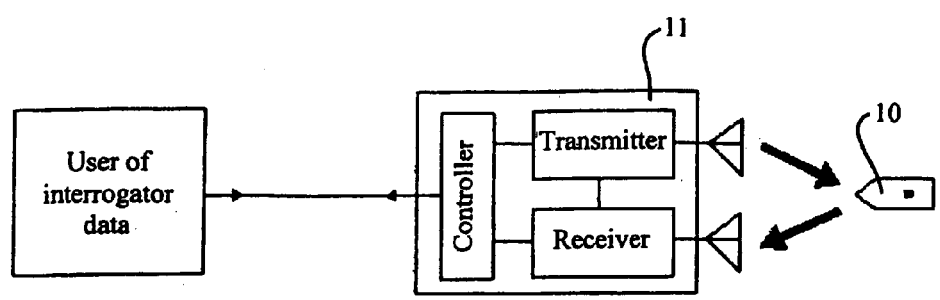
FIG. 1 shows a conventional electronic tag reading system.

FIG. 1 shows a tag reading system that is inherently insecure. It has the disadvantage that eavesdropping on the process of communication between electronic tag 10 and its interrogator 11, which is normally carried out by electromagnetic waves, allows a clandestine receiver that may be located nearby to make a record of the communication, and deduce the data content of a legitimate tag, thus allowing apparently legitimate tags to be manufactured by unscrupulous parties.

Figure 3:
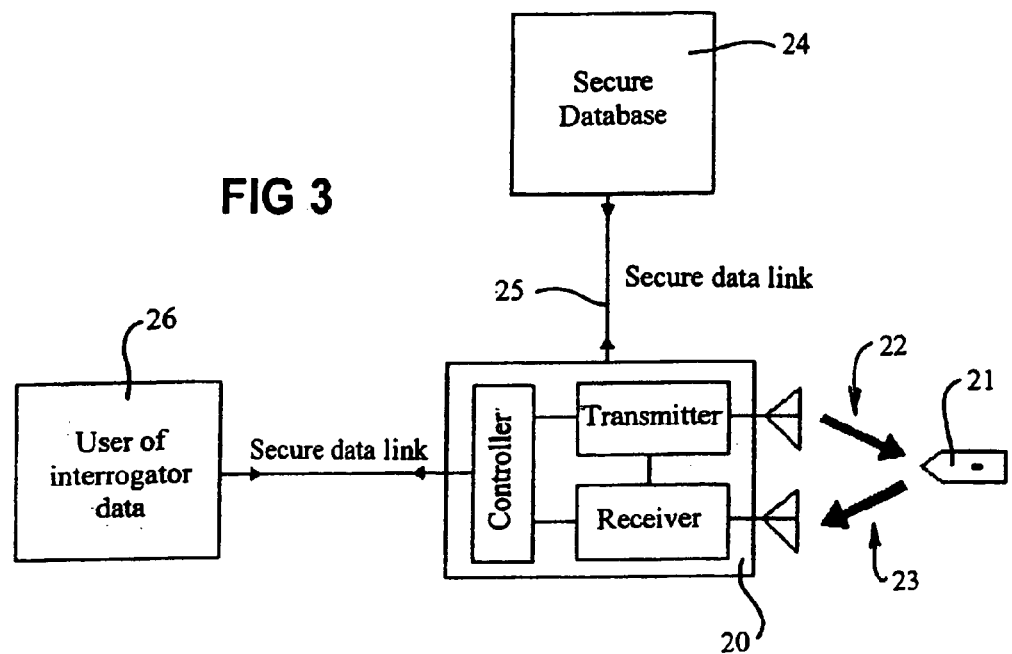
FIG. 3 shows an electronic tag reading system augmented by communication with a secure database.

FIG. 3 shows one embodiment of a tag reading system that has been made secure. In operation of the system shown in FIG. 3, interrogator 20 seeks the identity of tag 21 over an insecure radio frequency communications link represented by bold arrows 22, 23. Tag 21 responds to interrogator 20 with its identity from tag identity register 40 (refer FIG. 5) over the insecure radio frequency link. Interrogator 20 sends the identity of tag 21 to secure database 24 over preferably secure data link 25. For some transmissions a non-secure data link may be used. The data stored in tag identity register 40 may include a fixed and/or variable data string and may include encrypted data and/or data stored in tag data register 41 (refer FIG. 5).

Database 24 uses its data on tag identity, its history of authentications, and stored authentication test keys to select a test key to be sent to tag 21. The selection may be sequential or non-sequential and may be based on records of the number of prior authentications which are maintained independently but in synchronism by database 24 and tag 21. In some embodiments a genuine test key sent to the tag may be mixed with a non-authentic test key such as before or after the genuine test key is sent to the tag.

The selected authentication test key is sent from database 24 to interrogator 20 over the preferably secure data link 25. Interrogator 20 then sends the test key to tag 21 over insecure radio link 22. Tag 21 produces an authentication reply to interrogator 20 over insecure radio link 23.

Figure 4:
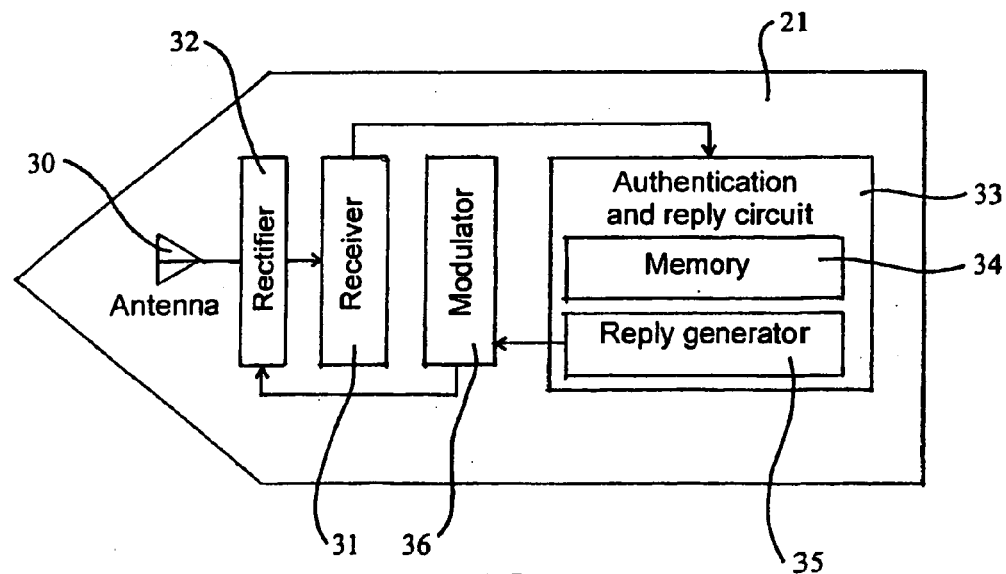
FIG. 4 shows one form of architecture of a securely authenticable tag.

FIG. 4 shows details of tag architecture incorporated in tag 21. Tag 21 includes common receiving/transmitting antenna 30 connected to receiver 31 via rectifier 32. An output of receiver 31 is operably connected to authentication/reply circuit 33. Authentication/reply circuit 33 includes memory 34 and reply generator 35. Reply generator 35 is operably connected to modulator 36. Modulator 36 is arranged such that it influences the impedance presented to antenna 30 via rectifier 32.

Figure 5:
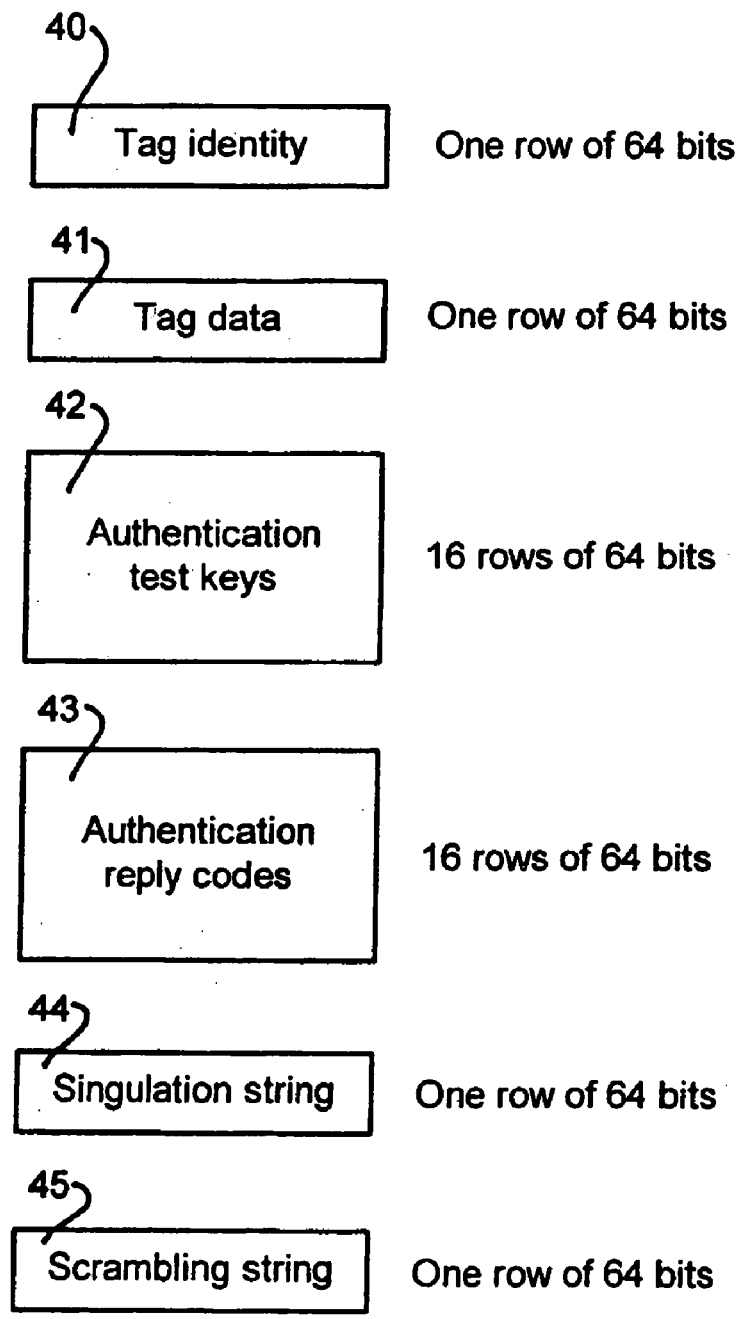
FIG. 5 shows a memory structure of a securely authenticable tag.

FIG. 5 shows the memory structure associated with memory 34 of tag 21. Memory 34 includes a tag identity register 40, a tag data register 41, an authentication test keys register 42, an authentication reply codes register 43, a singulation string register 44 and a scrambling string register 45. The tag identify, tag data, singulation string and scrambling string registers 40, 41, 44 and 45 may each include one row of data containing 64 bits. The test keys register 42 and the reply codes register 43 may each include 16 rows of data each containing 64 bits.

Figure 6:
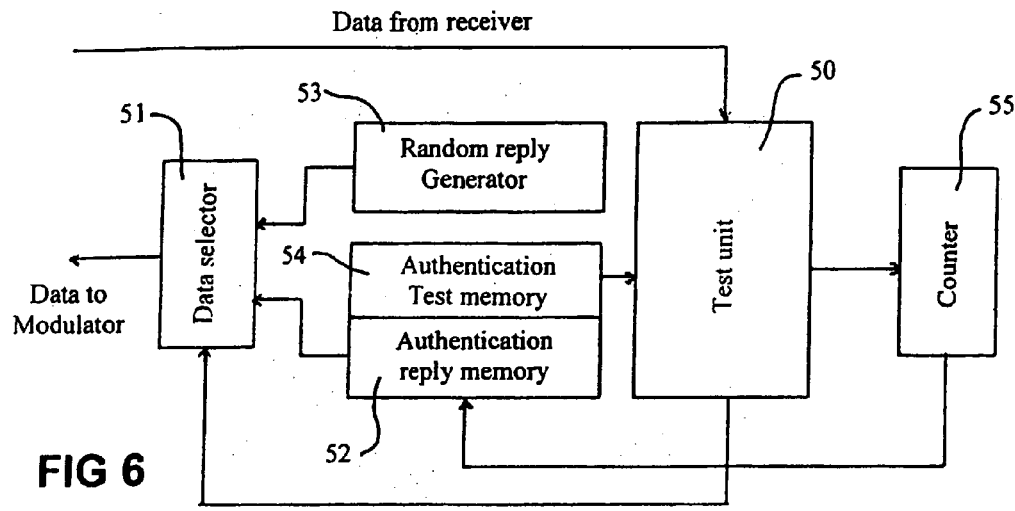
FIG. 6 shows a tag reply generator in a securely authenticable tag.

FIG. 6 shows details of authentication/reply circuit 33 in tag 21. Authentication/reply circuit 33 includes test unit 50 receiving data from receiver 31. Test unit 50 is operably connected to data selector 51 for selecting data from authentication reply memory 52 or from random reply generator 53 according to whether an authentic or a not-authentic reply signal respectively, is to be sent to modulator 36 and subsequently to interrogator 20. Test unit 50 receives from authentication test memory 54, which includes test keys register 42, a current test key determined by a count of authentications maintained in events counter 55.

The response is generated by the following rules. If a test key received by the tag matches a test key stored in memory register 42 at a location (eg. row) determined by a count of authentications maintained by the tag, an authentication reply code is selected from a corresponding location in authentication reply codes register 43 included in authentication reply memory 52.

If the test key received by tag 21 does not match the test key stored in memory register 42 at the location determined by the count of authentications maintained by the tag, the authentication response of the tag is produced by random reply generator 53.

In the case of a genuine authentication, the count of tag authentications maintained by events counter 55 and a separate count of authentications maintained by database 24 are each incremented. For this purpose interrogation power to tag 21 may be maintained at an adequate level and for an adequate time to allow a non-volatile memory in the tag associated with events counter 55 that maintains a count of tag authentications to be re-written with its incremented value. In a preferred realisation of the system, this count may be updated before an authentication reply (authentic or not-authentic) is provided by tag 21. Database 24 and tag 21 may signal between them the count or number of authentications.

The authentication reply is sent to secure database 24 which may check the reply of the tag against a selected row in the record of expected tag replies which is maintained in database 24, the selection depending on the count of authentications maintained by database 24, and may generate an authentic or a not-authentic signal.

The authentic or not-authentic signal is transmitted to interrogator 20 over secure data link 25. Interrogator 20 signals identity of tag 21 and sends an authentic or not-authentic signal to user 26 or whatever agent uses the output of interrogator 20. In some circumstances the authentic or not-authentic signal may be sent to an entity other than interrogator 20.

In other circumstances it may be desirable to modify the contents of memories 52, 54 in tag 21 from a site that is remote from database 24. This may be accomplished if communication between interrogator 20 and tag 21 can be made secure. One way to establish secure communication may be to provide a closed or electromagnetically shielded communication chamber around interrogator 20 from which electromagnetic waves that communicate to and from tag 21 do not radiate to the outside world, and to place tag 21 inside the closed chamber for the duration of recharging its memory contents.

In such a system interrogator 20, with assistance of secure database 24, may explore correctness of several entries in the authentication memory of tag 21 before signalling to tag 21 that its authentication memory may be written.

To support that exploration, events counter 55 is initialised to zero each time tag 21 receives power, and is incremented each time a successful authentication occurs during a period of continuous tag powering, until a predetermined final value is reached, whereupon a register that permits writing to the memory of tag 21 is enabled. The authentication memory of tag 21 and authentication count number may then be re-written by processes familiar to those skilled in the art of electronic tag design.

Figure 2:
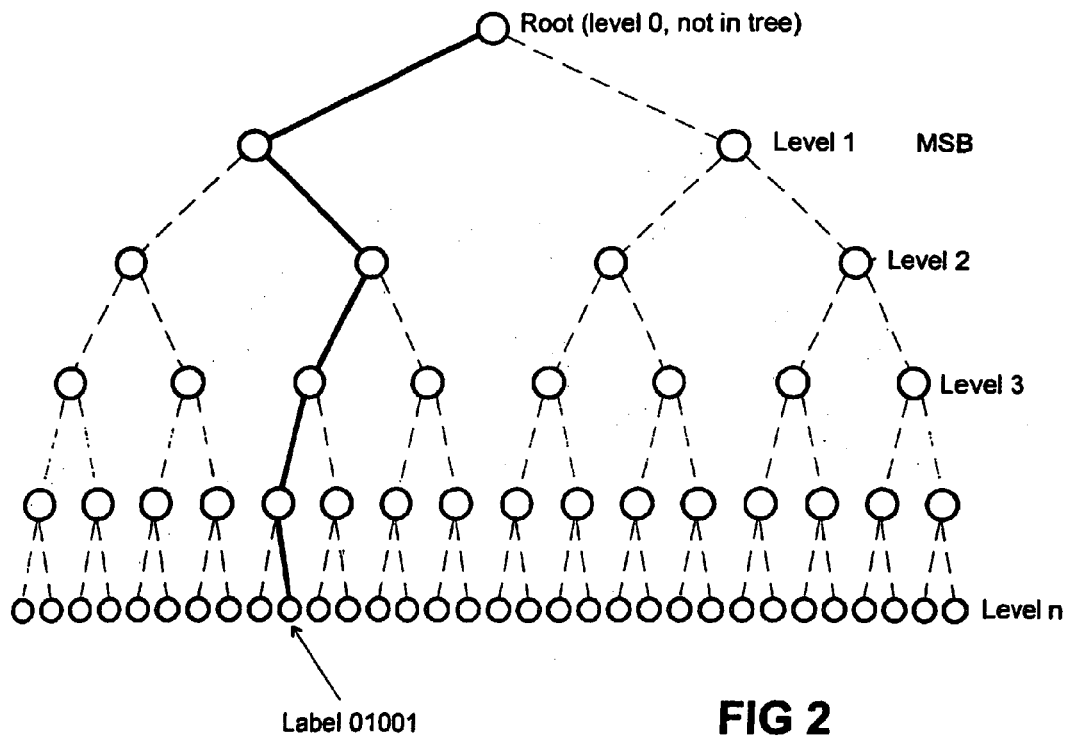
FIG. 2 shows how interrogation of an electronic tag may be viewed as an exploration of a binary tree.

In another embodiment, communication with a single tag may be achieved by initially communicating with a population of tags, and then singulating a single tag by various techniques known in the industry as tag selection or singulation. In one of those techniques, transmission, without interruption, of a selection or singulation string, may take place. After the selection string is transmitted, it may be compared in the tags with an internal singulation string, and only a tag in which a match is obtained will take part in further communication. In another such technique, known as tree scanning, as illustrated in part in FIG. 2, the interrogator may transmit bit by bit a singulation string, and may receive responses from tags. The transmitted data may be matched against a singulation string in the tags, and tags which have a mismatch in their singulation string and that transmitted by the interrogator become progressively unselected, until only a single tag is selected.

In common embodiments, a unique tag identity may be used as the singulation string. Authentication test keys and/or tag data may additionally or alternatively be used in singulation. The interrogator may at the first authentication operation read the unencrypted tag identification number or singulation string, so it knows which tag is being processed.

When a high level of security is desired, singulation that uses interrogator transmissions related to tag identity might be undesirable. In such cases, the tag may contain a singulation string, not related to its identity, used in a tree scanning process. The singulation string may be originally programmed into the tag, or may be automatically generated within it. The tags may echo the singulation string to the interrogator, but such echoes are relatively weak and are less susceptible to eavesdropping than are interrogator transmissions, and are in any case not meaningful to an eavesdropper except that they may indicate that a singulation is in progress.

During singulation, the singulation string may in part be provided by the tag, and followed by the interrogator, that is, the tag leads the way down the tree scan, and the interrogator follows. Alternatively, the singulation string may be provided by the interrogator, that is, the interrogator points the way down the tree scan, and the tag follows as long as singulation bits match. In both cases, with a suitable design of tag that ignores certain interrogator signals, the interrogator may transmit incorrect singulation information so as to disguise the fact that genuine singulation is in progress, and thus which tag replies were the correct ones. Even though non re-use of singulation or response data gives great security, this procedure has an advantage of adding further confusion to an eavesdropping process.

For greater security, the tag may contain a number of singulation strings that are not re-used. The singulation string may serve as a key to a secure database containing the tag identity and the correct tag reply to an authentication inquiry. For greater security the tag may contain a number of different correct tag replies that are not re-used. When the tag is singulated by the appropriate singulation string, and provides one of the correct tag replies, and those elements are compared in the secure database, the tags may be regarded as authentic.

If there is not a match between singulation bits transmitted to the tag and the appropriate set of singulation bits occurring within in the tag, the tag response may be a random response of the same length as the authentication response. After consulting the secure database, and identifying which tag is being dealt with, the interrogator may send one or more data streams to the tag. One of the data streams should match the first of a series of tag authentication test keys stored in memory register 42.

For an interrogation in which there is a match of transmitted data to tag authentication test key, the tag may respond with a return authentication code known only to the database. There may then be an incrementation in the tag and in the secure database of the content of non-volatile counters, which determine which of several authentication test keys is next in force.

For interrogations which do not so match, such as may occur when an non-authentic tag is interrogated, or a non-authentic interrogator performs the interrogation, the tag may respond with a random code of the same length and general structure as an authentic response.

In this way, eavesdropping on the transaction may not provide any clue as to the next correct authentication test key, or next tag authentication response. All an eavesdropper will detect is a sequence of apparently random transactions.

Figure 7:
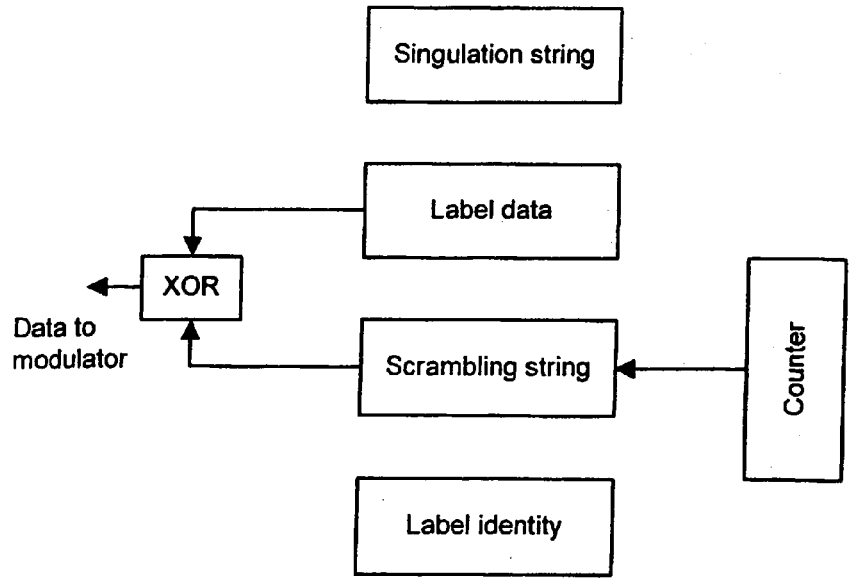
FIG. 7 shows a secret scrambling string used for modulating a tag reply.

In a variation permitting tag identity or data to be disguised, the memory may contain, as shown in FIG. 7, in addition to its secret singulation string and secret authentication string a secret scrambling string. Using appropriate variations on the connections shown in FIG. 7, the secret scrambling string may be used to modulate (digitally, an XOR operation) the tag reply when tag identity or data is sought. In one embodiment, the authentication string may be used as the scrambling string, or as an input to a pseudo random string generation process, another input being the number of genuine tag authentications, the count being maintained separately within the tag and within the secure database.

The use of a scrambling string may ensure that no aspect of interrogator transmission or tag response is of significance to an eavesdropper. It has an advantage in that variable data present in the tag, but not yet present in the database, may be extracted to the database in a totally secure way.

Finally, it is to be understood that various alterations, modifications and/or additions may be introduced into the constructions and arrangements of parts previously described without departing from the spirit or ambit of the invention.

The invention claimed is:

1. A system for secure communication between an interrogator and an RFID tag, said system comprising:
    means for singulating said tag in a population of RFID tags;
    means for extracting from said tag, identity data adapted to uniquely identify said tag;
    means for communicating said identity data to a secure database;
    means for providing authentication data by said database;
    means for communicating said authenticating data to said interrogator;
    means for communicating said authentication data from said interrogator to said tag, and means within said tag for authenticating said interrogator; and
    means for providing a further communication between said tag and said interrogator after the tag has authenticated said interrogator, wherein at least one stream of data between said tag and said interrogator includes random data generated via a random physical process.

2. A system according to claim 1 wherein said tag and said database each includes means for maintaining a count of secure authentications.

3. A system according to claim 2 wherein said count is separately maintained by said tag and by said database and is incremented following each secure authentication.

4. A system according to claim 2 wherein said count includes secure authentications of said interrogator.

5. A system according to claim 2 wherein said count includes secure authentications of said tag.

6. A system according to claim 1 including means for comparing said further communication with reference data for determining if said tag is authentic.

7. A system according to claim 6 wherein said interrogator includes said comparing means.

8. A system according to claim 6 wherein said database includes said comparing means.

9. A system according to claim 1 wherein said tag includes authentication test data for authenticating a transmission from said interrogator and authentication test data for authenticating a tag.

10. A system according to claim 9 wherein said tag includes a plurality of said authentication data.

11. A system according to claim 9 wherein said database includes a copy of said authentication data.

12. A system according to claim 9 wherein said authentication data is not reused.

13. A system according to claim 1 wherein said identity data includes a fixed data string.

14. A system according to claim 1 wherein said identity data includes a variable data string.

15. A system according to claim 1 wherein said identity data is encrypted.

16. A system according to claim 1 wherein said identity data includes random numbers.

17. A system according to claim 16 wherein a response of said tag to an authentic interrogator belongs to a finite set known to said database, and wherein a response of said tag to a non-authentic interrogator is similar in form but does not belong to said set.

18. A system according to claim 1 wherein said further communication is from said tag to said interrogator.

19. A method for secure communication between an interrogator and an RFID tag, said method comprising:
    singulating said tag from a population of RFID tags;
    extracting from said tag, identity data adapted to uniquely identify said tag;
    communicating said identity data to a secure database;
    providing authentication data by said database;
    communicating said authentication data to said interrogator;

communicating said authentication data from said interrogator to said tag;

authenticating said interrogator with said tag; and providing a further communication between said tag and said interrogator after the tag has authenticated said interrogator, wherein at least one stream of data between said tag and said interrogator includes random data generated via a random physical process.

20. A method according to claim 19 wherein said tag and said database each maintain a count of secure authentications.

21. A method according to claim 20 wherein said count is separately maintained by said tag and said database and is incremented following each secure authentication.

22. A method according to claim 21 wherein said tag includes authentication test data for authenticating a transmission from said interrogator and authentication test data for authenticating a tag.

23. A method according to claim 20 wherein said count includes secure authentications of said interrogator.

24. A method according to claim 20 wherein said count includes secure authentications of said tag.

25. A method according to claim 19 wherein said further communication is from said tag to said interrogator.

26. A method according to claim 19 including comparing said further communication with reference data for determining if said tag is authentic.

27. A method according to claim 26 wherein said tag includes a plurality of said authentication data.

28. A method according to claim 26 wherein said database includes a copy of said authentication data.

29. A method according to claim 26 wherein said authentication data is not reused.

30. A method according to claim 26 wherein said interrogator performs said comparing.

31. A method according to claim 26 wherein said database performs said comparing.

32. A method according to claim 19 wherein said identity data includes a fixed data string.

33. A method according to claim 19 wherein said identity data includes a variable data string.

34. A method according to claim 19 wherein said tag identity data is encrypted.

35. A method according to claim 19 wherein said identity data includes random numbers.

36. A system according to claim 19 wherein a response of said tag to an authentic interrogator belongs to a finite set known to said database, and wherein a response of said tag to a non-authentic interrogator is similar in form but does not belong to said set.

37. A system for secure communication between an interrogator and an RFID tag, said system comprising:

means for extracting from said tag, identity data adapted to uniquely identify said tag;

means for establishing secure communications between said interrogator and a secure database;

means for storing coinciding random authentication codes in the tag and in the database, the authentication codes in the database being linked to the tag identity;

characterized in that said system includes means for selecting on the basis of the number of successful previous authentications corresponding random authentication codes for comparison in both the database and the tag and there is only a single use of each stored code for authenticating said tag.

38. A system according to claim 37 wherein the RFID tag is affixed to an object, whereby the system may be used to authenticate the object.

39. A system according to claim 37 further comprising means for singulating said tag.

40. A system according to claim 37 further comprising means for authenticating the interrogator.

41. A system according to claim 40 wherein said random authentication codes include interrogator authentication data.

42. A system according to claim 41 wherein said tag includes a plurality of said interrogator authentication data.

43. A system according to claim 41 wherein said interrogator authentication data is not reused.

44. A system according to claim 40 wherein a response to an authentication request from an interrogator that has not been correctly authenticated is produced by a random number generator internal to said tag.

45. A system according to claim 37 wherein said tag identity data is encrypted.

46. A method for secure communication between an interrogator and an RFID tag, said method comprising:

extracting from said tag, identity data adapted to uniquely identify said tag;

establishing secure communications between said interrogator and a secure database;

storing coinciding random authentication codes in the tag and in the database, the authentication codes in the database being linked to the tag identity;

characterized in that said method includes selecting on the basis of the number of successful previous authentications corresponding random authentication codes for comparison in both the database and the tag and there is only a single use of each stored code for authenticating said tag.

47. A method according to claim 46 when used for authentication of objects bearing said tag.

48. A method according to claim 46 including the step of singulating said tag.

49. A method according to claim 46 including the step of authenticating the interrogator.

50. A method according to claim 49 wherein said random authentication codes include interrogator authentication data.

51. A method according to claim 50 wherein said tag includes a plurality of said interrogator authentication data.

52. A method according to claim 50 wherein said interrogator authentication data is not reused.

53. A method according to claims 49 wherein a response to an authentication request from an interrogator that has not been correctly authenticated is produced by a random number generator internal to said tag.

54. A method according to claim 46 wherein said tag identity data is encrypted.

* * * * *

UNITED STATES PATENT AND TRADEMARK OFFICE
CERTIFICATE OF CORRECTION

PATENT NO. : 7,187,267 B2
APPLICATION NO. : 10/863144
DATED : March 6, 2007
INVENTOR(S) : Peter Harold Cole It is certified that error appears in the above-identified patent and that said Letters Patent is hereby corrected as shown below:

Column 5, line 22, after "signal", insert --,--.

Column 7, line 42, after "string", insert --,--.

Column 8, line 17, "includes" should read --include--.

Column 10, line 54, "claims" should read --claim--.

Signed and Sealed this

Fifteenth Day of May, 2007

JON W. DUDAS
*Director of the United States Patent and Trademark Office*